United States Patent [19]

Beuke

[11] Patent Number: 4,659,514

[45] Date of Patent: Apr. 21, 1987

[54] ESTERIFICATION OF ROSIN ACID WITH CALCIUM HYDROXYBENZYL PHOSPHONATE CATALYST

[75] Inventor: Donald Beuke, Kingswood, Tex.

[73] Assignee: Ciba-Geigy Corporation, Ardsley, N.Y.

[21] Appl. No.: 822,437

[22] Filed: Jan. 27, 1986

[51] Int. Cl.$^4$ ............................ C09F 1/00; C09F 5/00
[52] U.S. Cl. ........................................ 260/104; 556/19
[58] Field of Search ................. 260/97, 102, 103, 104; 556/19

[56] References Cited

U.S. PATENT DOCUMENTS

| | | | |
|---|---|---|---|
| 2,608,542 | 8/1952 | Smith et al. ............................ | 260/27 |
| 2,628,249 | 2/1953 | Bruno ................................... | 260/103 |
| 2,656,343 | 10/1953 | Ritchie ................................. | 260/103 |
| 3,310,575 | 3/1967 | Spivack ................................. | 556/19 |
| 3,575,951 | 4/1971 | Schuller et al. ........................ | 260/99 |
| 4,515,713 | 5/1985 | Wideman et al. ....................... | 260/98 |

*Primary Examiner*—Herbert S. Cockeram
*Attorney, Agent, or Firm*—Harry Falber

[57] ABSTRACT

An esterfication process particularly for the preparation of polyesters and polymeric esters wherein aliphatic or aromatic carboxylic acids are reacted with appropriate alcohols in the presence of catalytic amounts of calcium bis[monoethyl(3,5-di-tert-butyl-4-hydroxybenzyl) phosphonate], the presence of said phosphonate serving to reduce the time necessary for complete esterification and to provide esters with increased oxidation stability and better color.

7 Claims, No Drawings

ESTERIFICATION OF ROSIN ACID WITH CALCIUM HYDROXYBENZYL PHOSPHONATE CATALYST

It is known that esterfication reactions can be conducted in the presence of a variety of esterification catalysts. However, numerous difficulties are encountered in rosin ester, polyester and polymeric ester esterifications utilizing the state of the art catalysts. These difficulties can be grouped into unduly prolonged esterification times, poor oxygen stability and color formation. More specifically, the prolonged reaction times required to complete the esterification reaction are uneconomical and, more importantly, may result in decarboxylation of the acid so as to eliminate sites for the esterification reaction. Impure products result. the oxygen instability of the resulting esters is particularly in evidence during initial storage, there being a propensity to formhydroperoxides and peroxides, and during subsequent use thereby severely limiting the applicability of the esters. Uses as plasticizers in polymers and tackifiers in adhesives are substantially foreclosed by such instability. Likewise, the formation of dark coloration substantially limits the areas of use for the resulting esters.

Frequently used acidic and basic esterification catalysts tend to promote the difficulties noted hereinabove. While various metal salts such as calcium formate, calcium stearate and calcium acetate provide satisfactory catalytic activity, they do not provide antioxidant or color inhibition effects. Accordingly, it is essential to post-add antioxidants and other stabilizers in order to obtain long-term stability. Reference is also made to U.S. Pat. No. 4,172,070 wherein rosin esters are prepared in the presence of arylsulfonic acid catalysts. Although improved esterfication and stability is indicated, longer reaction times than desired are still required and some decarboxylation occurs. The decarboxylation is a more serious problem when the acid is added to the initial reaction mix or during early stages of the esterification reaction. Such decarboxylation results in the formation of low molecular weight materials which must necessarily be removed in order to obtain esters of appropriate physical properties such as softening points. It is also required to wash the sulfonic acid out of the polyester in order to obtain purer products and to consider the possibility of some post-addition of antioxidants in view of the continuing proclivity to form hydroperoxides or peroxides during processing and storage.

It is, therefore, the primary object of this invention to provide an esterification catalyst which significantly reduces the esterification reaction time so as to substantially eliminate the problems associated with prolonged reactions and which facilitates obtaining pure, completely esterified products exhibiting oxygen stability and reduced color formation.

Other objects and advantages of this invention will become apparent from the following description thereof.

It has now been surprisingly discovered that by utilizing calcium bis[monoethyl(3,5-di-tert.butyl-4-hydroxybenzyl)phosphonate as an esterification catalyst for rosin esters, esterification reaction times are substantially reduced and esters of significantly improved performance characteristics are obtained. Thus, the overall reaction can be completed in a maximum of about seven hours in contrast to the 10–14 hours utilized in the current approaches in order to obtain esters of comparable acid numbers. The reaction conditions minimize decarboxylation and result in much purer products. The need for special removal steps is thus substantially eliminated. Esters of desired softening points are prepared. Similar advantages are obtained in the preparation of other polyesters. The phosphonate also provides esters having excellent antioxidant properties. Correspondingly, post-esterification addition of stabilizers is not required. The absence of formation of hydroperoxide and peroxide groups during storage and the long term stability of the polyesters and polyester-containing formulations are evidence of such characteristics. Color formation in the polyesters and formulated products is likewise reduced. Thus, oxygen-stable esters of good color and good purity are prepared.

The process of this invention involves reacting aliphatic or aromatic carboxylic acids with appropriate alcohols at temperatures ranging from about 150° to 300° C. Typical aliphatic acids include $C_1$–$C_{18}$ monocarboxylic acids such as butyric, caproic, lauric, myristic, palmitic, stearic, oleic, linoleic and linolinic acids; $C_2$–$C_{18}$ dicarboxylic acids such as succinic, glutaric, adipic, azelaic, sebacic and maleic acids; tricarboxylic acids such as citric acid; and rosin acids (abietic and pimaric acid types). Aromatic mono-, di- and tri-carboxylic acids include benzoic acid, phthalic acid, isophthalic acid, terephthalic acid, methoxy benzoic acid, naphthoic acid, cinnamic acid and trimellitic acid; as well as aralkyl and alkaryl carboxylic acids and anhydrides such as phthalic and trimellitic anhydrides. The rosin acids are preferred for use in this invention.

Typical alcohols include $C_1$–$C_{18}$ monohydric alcohols such as ethanol, butanol, octanol, dodecanol and stearyl alcohol; $C_2$–$C_{18}$ diols such as ethylene glycol, propanediol, butanediol, butylene diol and hexanediol; and polyhydric alcohols such as glycerol, pentaerythritol, dipentaerythritol, tripentaerythritol, trimethylolethane and trimethylolpropane. The polyhydric alcohols are preferred. Stoichiometric amounts of acid and alcohol are utilized, with the possibility of utilizing up to about a 30% equivalent excess of alcohol if a polyhydric alcohol is used, with a 5–30% excess particularly applicable. As noted, the invention is particularly applicable for preparing di-, tri- or tetra-esters as well as polymeric esters such as polyethylene terephthalate.

The calcium bis[monoethyl(3,5-di-tert.butyl-4-hydroxybenzyl) phosphonate] falls within the disclosure of U.S. Pat. No. 3,310,575. Preparative procedures and areas of use are noted in said patent. The phosphonate is commercially available from CIBA-GEIGY Corporation as IRGANOX 1425. The catalyst is utilized in concentrations of from about 0.05–10.0%, by combined weight of acid and alcohol, preferably from about 0.2–0.6%, and most preferably about 0.5%.

The phosphonate may be added prior to the initiation of the esterification reaction or at a designated point during the reaction when the original acid number has been reduced by about 10 to 67%. Completion of the reaction is determined by monitoring of the acid number, esters of acid number below about 15 generally being desired. The process of the invention will generally not exceed seven hours in order to prepare the desired esters. The resulting esters show good color and good oxidation stability during storage and in formulated products.

The following example will further illustrate the embodiments of the instant invention. In this example, all parts and percentages are by weight unless otherwise noted.

EXAMPLE

A reaction vessel is charged with 500 grams S-Rosin (acid number 179), 71.1 grams pentaerythritol (30% stoichiometric excess), 2.5 grams calcium bis[monoethyl(3,5-di-tert.butyl-4-hydroxybenzyl)-phosphonate] and 25 grams xylene and heated rapidly to 275° C. Heating is continued at 275° C. and acid numbers are periodically determined. Heating is discontinued when an acid number of 15 or less is obtained and the softening point (determined by the ring and ball method-ASTM E28-67) is in the 90°–99° C. range. The latter softening point can be raised by continued heating with an increased nitrogen flow to remove impurities.

The procedure is identically repeated eight times and, in each instance, esterification is complete after a reaction time of 6–7 hours. This represents a very desirable 30% decrease in esterification time as contrasted with the currently utilized prior art approaches. In addition, esters with low color are obtained.

The oxygen stability of the ester is determined by grinding the product to a 40 mesh size and determining hydroperoxide values by iodometric titration. Since a greater presence of hydroperoxides is indicative of less oxygen stability, lower hydroperoxide values are desired. The ester prepared hereinabove after storage for 24 hours at 23° C. had a hydroperoxide value of 116 ppm. In contrast, a commerical rosin ester (Zonester 100 from Arizona Chemical) after 24 hrs. exhibited a peroxide value of 230 ppm. The 50% reduction is thus indicative of the storage and oxygen stability exhibited by the esters prepared according to the instant process.

Summarizing, it is seen that this invention provides an improved esterification process. Variations may be made in proportions, procedures and materials without departing from the scope of the invention as defined by the following claims.

What is claimed is:

1. In an esterification procedure wherein a rosin acid is reacted with an equivalent amount or a maximum 30% excess of an alcohol at elevated temperatures in the presence of a catalyst for a period of time sufficient to yield an ester having a maximum acid number of 15, the improvement comprising conducting said reaction in the presence of from about 0.05–10.0%, by weight, of calcium bis[monoethyl-(3,5-di-tert.butyl-4-hydroxybenzyl)phosphonate] as said catalyst.

2. The process of claim 1, wherein said alcohol is a $C_1$–$C_{18}$ monohydric alcohol, $C_2$–$C_{18}$ diol or polyhydric alcohol.

3. The process of claim 2, wherein said alcohol is pentaerythritol.

4. The process of claim 1, wherein said phosphonate is added to the acid and alcohol reactants prior to the initiation of the esterification reaction.

5. The process of claim 1, wherein a rosin acid is reacted with a 5–30% excess equivalent amount of pentaerythritol in the presence of 0.5%, by weight, of said phosphonate.

6. The ester resulting from the process of claim 1.

7. The ester resulting from the process of claim 5.

* * * * *